Jan. 12, 1971

R. A. RAPPAPORT 3,555,381

DIGITAL SYSTEM

Filed May 31, 1968

3 Sheets-Sheet 2

United States Patent Office 3,555,381

Patented Jan. 12, 1971

3,555,381

DIGITAL SYSTEM

Richard A. Rappaport, Henrietta, N.Y., assignor to Sybron Corporation, Rochester, N.Y., a corporation of New York Filed May 31, 1968, Ser. No. 733,334
Int. Cl. H02k *37/00*
U.S. Cl. 318—138 5 Claims

ABSTRACT OF THE DISCLOSURE

Digital circuitry converting input pulses into stepping motor winding energization pattern. Input pulses are converted by an up-down counter into sequence of pulse patterns corresponding to desired sequences of energization patterns, and produce gating pulses maintaining energization patterns between input pulses for only just such time as is needed to assure completion of motor steps. The counter is a flip-flop arrangement receiving input pulses from separate up and down input gates. The counter can produce more than the desired number of patterns, but production of undesired patterns makes the counter revert to a desired pattern. The stepping motor upon stepping to one of its limits disables the corresponding input gate, in effect.

This invention relates to pulse responsive systems, exemplified, in this case, by a process control system wherein a process controller of the analog type has its set point adjusted by a step motor, in proportion to the number of pulses in a train of pulses. The step motor has a plurality of windings which have to be energized selectively and in a certain order, so the system includes logic circuitry for converting the single pulses in the train to groups of pulses energizing the appropriate motor windings in the appropriate order.

Systems as described in the foregoing are known in the prior art, being used not just for adjusting controller set point but generally as means for converting digital data for purposes of measurement, control, positioning, telemetering and the like.

One novel feature of the present invention is provision for removal of power from the stepper motor windings when the motor is not being stepped. Another novel feature of the invention is provision for limit-switch control of an up-down counter forming the heart of the logic circuitry. Still another novel feature of the invention is provision of means for detecting and correcting error in the state of the up-down counter under startup and transient conditions.

Figure 1:
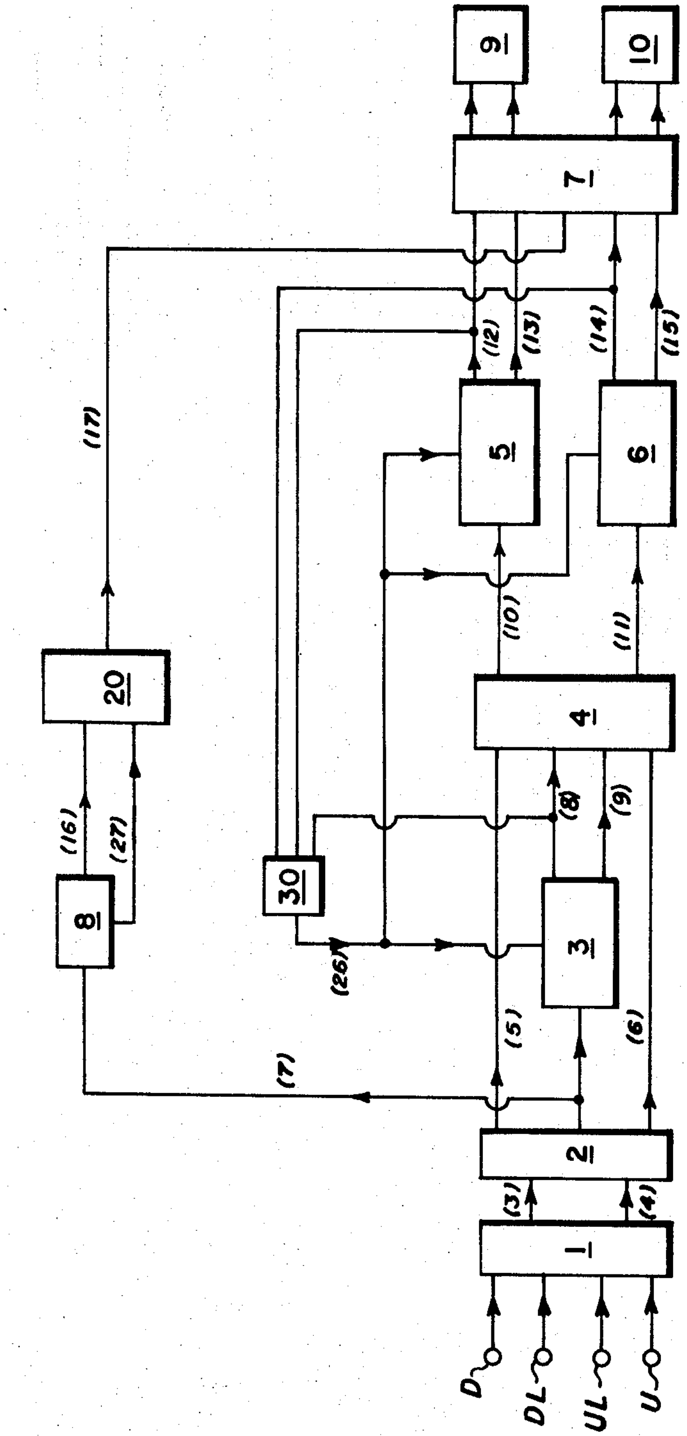
Figure 3:
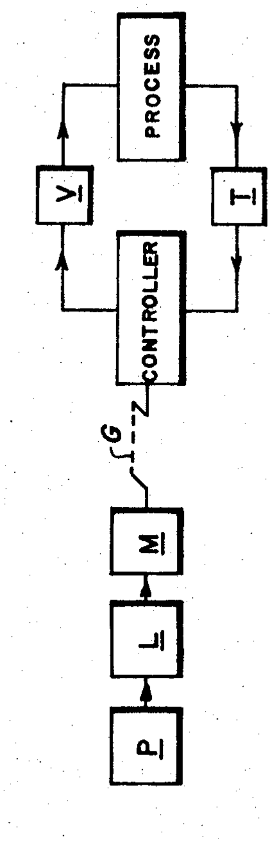
Figure 2:
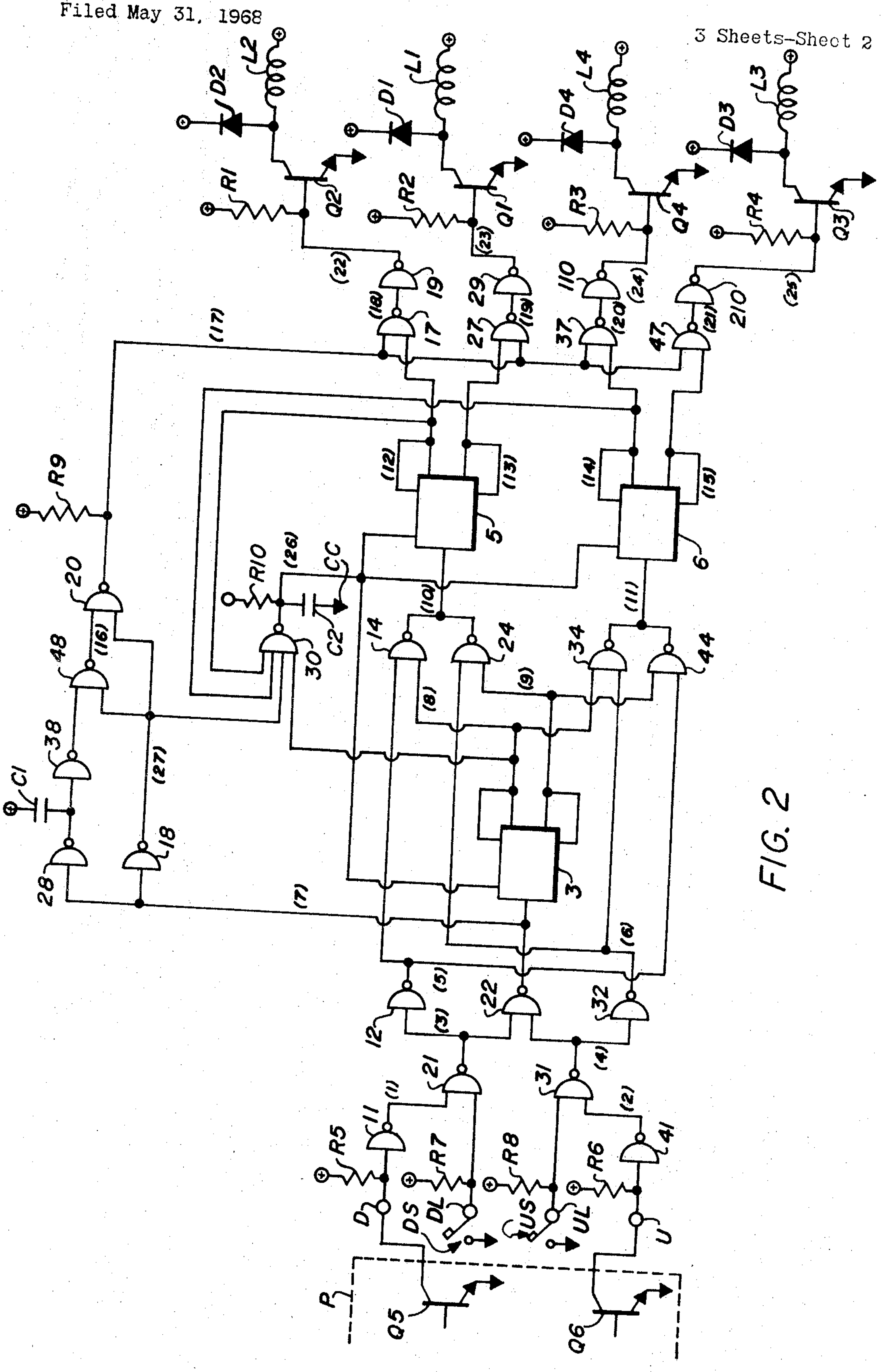
Figure 4:
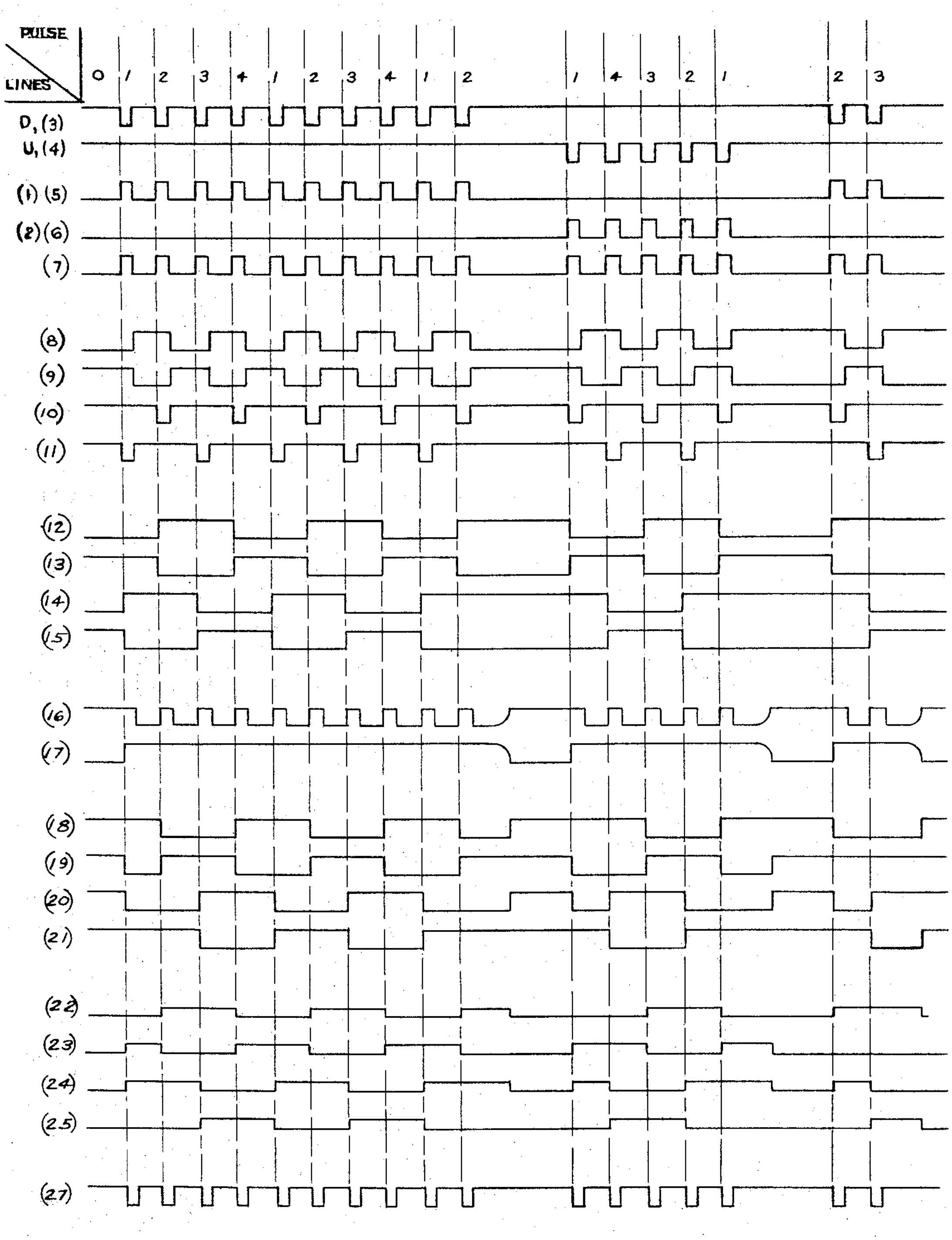

In the drawings, FIG. 1 is a box diagram of the invention; FIG. 2 illustrates a detailed application of the invention; FIG. 3 is a box diagram of an application of the invention as shown in FIG 2; and FIG. 4 is a pulse timing chart.

The reference characters used in the drawing reflect the embodiment of the invention by means of printed circuit "chips." Thus, referring to FIGS. 1 and 2, the gates 11, 21, 31 and 41 are four logic elements of a chip 1, gates 110 and 210 are two logic elements of a chip 10, and so on with the exception of flip flops 3, 5 and 6, and gates 20 and 30, each of which is the only herein-identified entity on the corresponding chip. This last sort of chip need not be distinguished by reference numeral from the corresponding element. In other words, save for the noted exceptions, each logical entity is identified by a reference numeral, the first digit of which distinguishes it from other entities on its chip, whereas the remaining digit or digits identifies its chip. (The manner of identification will be evident from FIG. 1 wherein the chips are shown as such.)

In FIG. 2, resistors R1 through R10 are resistors coupling various points on the circuit to B+ voltage (as indicated by the circled plus signs). In addition, each chip has an unshown connection to B+. The B+'s shown are just those to which reference need be made in explaining operation. Each chip also has an unshown connection to circuit common. Where it is expedient to show it, circuit common is indicated by an inverted triangle, one of which has been provided with the reference character CC, by the way of example. Conductive paths between the chips, and between the logical elements, are shown by the usual interconnecting lines, identified by where need be by numerals in parenthesis.

Q1 through Q4 are the respective driver transistors for the windings L1 through L4 of a stepping motor, diodes D1 through D4 being provided to damp inductive surges in said windings. Q5 and Q6 are output transistors of two output channel pulse sources P. Reference characters D, DL, UL, U, C1, and C2 identify four input terminals and a pair of capacitors, respectively, the purposes of which will become evident shortly. A pair of shorting switches is identified by the reference characters US and DS.

Turning now to FIG. 1, pulses applied respectively (but not simultaneously) to terminals D and U are counted down and up by an up-down counter, represented by flip-flop chips 3, 5 and 6 and gate chips 2 and 4. The count, which is a four-digit binary representation is presented to gate chip 7 on lines (12), (13), (14), and (15). The gating of the count to chips 9 and 10 is under control of a one-shot multivibrator chip 8 and gate chip 20. Thus, a D pulse (or a U-pulse) goes via these latter chips to gate 7. The trailing edge of this pulse causes the multivibrator to produce a further pulse, also routed to gate 7, so that the count is gated via gate 7 long enough that motor-energizing circuitry (not shown in FIG. 1) can sufficiently energize the stepping motor (not shown in FIG. 1).

The counter can sometimes produce a count not wanted. Here, the counter should count only to four, and further, in an order that is fixed except for direction, e.g., 1, 2, 3, 4 or 3, 4, 1, 2, or 2, 1, 4, 3, etc. A gate chip 30 monitors flip-flops 3, 5 and 6 on lines (8), (12) and (13), and resets or clears the flip-flops to one of the four permitted counts, in response to flip-flop outputs corresponding to an unwanted count. The output of gate 30 is connected to reset connections of flip-flops 3, 5 and 6, so capacitor C2 and resistor R10 are provided to filter out transients that might otherwise unwantedly reset the flip-flops.

Terminals DL and UL are for limiting. Means not shown in FIG. 1 would pulse terminal DL, say, after a certain number of consecutive D-pulses at terminal D. The pulse at DL causes gate chip 1 to stop pulsing line (3), even if more D-pulses come along. Ordinarily, the means is a switch actuated by the motor if it creates more than a given extent of movement in a given sense. Limiting action ceases when the motor is back within limits.

While FIG. 1 can find realization in many and various forms, the preferred form of the invention is shown in FIG. 2, which illustrates detail of an actual embodiment.

FIG. 2 contemplates operation with 3 millisecond (ms.) pulses at 100 pulses per second. The repetition rate is chosen in view of the needs of the stepper motor, each step of which requires 10 ms. of winding energization. Unless pulses are being received, the terminals D, DL, UL and U are 5 volts above zero volts, i.e., above circuit common. A pulse is created by shorting a terminal to zero volts, or at least to a potential substanially below 5 volts, around a volt or so, say, above circuit common.

The gates are NAND type so that unless all inputs of a gate are 5, i.e., 5 volts above circuit common, gate output is 5, and where all inputs of a gate are 5, gate output is 0. For single-input gates, input produces output 0, and input 0 produces output 5.

Circuit operation will be described verbally, but it will be useful to refer to the pulse timing chart of FIG. 4 in perusing the verbal description which is basically the timing chart in words. In the chart, the horizontal graphs show voltage levels at the terminals and connecting lines of FIG. 2, and are correspondingly numbered. Numerals 0, 1, 2, 3, 4, 1, 2, 3, 4, etc., at the top of the chart identify pulses as they appear in time sequence at the terminals D and U. Voltage levels 0 and 5 can be distinguished by projecting the horizontal portions of any graph to its identifying reference character at the left. Any such projected portion crossing the top part of the reference character is level 5, but if it crosses the bottom part of the reference character, it is level 0.

In the beginning, if all terminals are 5, then (1) and (2) are 0, (3) and (4) are 5, (5) and (6) are 0, (7) is 0, and so on. If a pulse brings terminal D to zero, the other terminals remain 5. Accordingly, (1) becomes 5, (3) becomes 0, (5) becomes 5. As (4) remains 5, (7) becomes 5. Assuming (8) and (9) were 0 and 5, respectively, and remain so when (5) becomes 5, then (10) remains 5. That is, (6) was (and is still) 0, (5) and (8) were 0, and (6) and 9) were 0 and 5, respectively, so (10) was (5).

Assuming that (12), (13), (14) and (15) were 0, 5, 0, 5, respectively, in the beginning, neither (12) nor (13) change. However, supposing (11) to have been 5, originally, (5) has become 5, so that with (9) begin 5, gate 44 changes (11) to 0. Assuming (17) to have been 0 originally, (18), (19), (20) and (21) were then 5, and (22), (23), (24) and (25) were 0, meaning that transistors Q1 through Q4 were off and the windings L1 through L4, unenergized.

This supposes (16) was 5 originally, because (27) would then have been 5, also. Now, however, (7) is 5 so that (27) becomes 0, and (17) becomes 5. Since (11) has becomes 0, (14) and (15) become 5 and 0, respectively. This puts 5 on all the inputs of gates 27 and 37; hence, (19) and (20) become 0 and (23) and (24) become 5, and provide a binary representation of pulses corresponding to the desired pattern of motor winding energization. Thus Q1 and Q4 turn on and energize L1 and L4, and since 0 is on input each of gates 17 and 47, (19) and (20) remain 5, hence, Q1 and Q2 do not energize L2 and L3. The above applies for the 3 ms. of the first D-pulse, but now comes the 7 ms. (or more) till the next pulse, in which all terminals D, DL and U are 5. The trailing edge of this D-pulse, however, fires the one-shot multivibrator (the logic elements on chip 8) which is set to produce 0 on (16) for 7 ms.

The end of the D-pulse sees (7) become 0 again, making (27) 5, so (17) remains 5, since there is 0 on (16) now. The disappearance of the D-pulse made (1) 0 again, so that (3) became 5, while (4) remained 5 (it remains 5, and (2) and (6) remain 0, as long as no pulses are applied to terminal U). The 0 applied to flip-flop 3, makes (8) 5 and (9) 0. Since 5 has become 0, (10) remains 5, but now (11) becomes 5. The flip-flop output states do not change, i.e., (12), (13), (14) and (15) remain 0, 5, 5 and 0, respectively.

The foregoing takes care of the first 10 ms. of operation, but now let a second D-pulse produce a 0 on terminal D. In response, (1), (3), (5), (7) and (16) assume the states they took on in response to the initial D-pulse. The effect of this is that (17) remains 5. This produces 0 on (10), because there is 5 on both (8) and (5), and the 0 actuates flip-flop 5, so that (12) becomes 5 and (13) becomes 0, thereby causing (18, (19) and (20) to become 0, 5 and 0, respectively, (21) remaining 5, since (12) has become 5, and (14) and (17) have each remained 5, whereas gates 27 and 47 each have 0 on one input. As a result, Q1 stops firing, Q4 continues to fire, and Q2 commences to fire. L4 and L2 are now energized instead of L4 and L1.

The trailing edge of the second D-pulse, in addition to causing the multivibrator action which in effect makes line (17) continuously 5 as long as D-pulses are applied, actuates flip-flop 3, so that (8) and (9) become 0, and 5, respectively. Now (10) becomes 5, since (5) and (6) are each 0 in the 7 ms. after the second pulse, and none of gates 14, 24, 34 and 44 is 5 on both its inputs. Accordingly, flip-flops 5 and 6 remain the same in these 7 ms. as they were in the immediately preceding 3 ms.

The motor has now stepped twice in 20 ms. If a third D-pulse now begins, (1), (3), (5), (7) and (16) again assume the states they took on in response to the initial pulse, and (17) continues 5, and (8), (9) and (10) continue as in the last 7 ms. of the preceding 20 ms. However, (11) goes to 0, because the change of (5) to 5 puts 5 on both inputs to gate 44. Since (6) and (8) are 0, (10) remains 5. The flip-flop 6 therefore puts 0 on (14) and 5 on (15). Both inputs of gate 47 being 5, (25) becomes 5. Both inputs on gate 17 remain 5, so (22) remains 5. Accordingly, Q2 continues to fire and Q3 begins to fire. Since (13) remains 0 and (14) has become 0, Q4 ceases to fire and Q1 remain unfiring. The stepper motor windings L2 and L3 are now energized.

The end of the third D-pulse, of course, starts the multivibrator pulse, so (17) continues 5 after the pulse disappears. As in the first two 10 ms. periods, (7) becomes 0 and actuates flip-flop 3, putting 5 and 0 on (8) and (9), respectively. This results in none of the gates 14, 24, 34 and 44 having both inputs 5. Accordingly, (10) remains 5 and (11) becomes 5, so that flip-flops 5 and 6 continue in the states they were in when the third D-pulse expired. Since L2 and L3 are energized for a full 10 ms., the motor makes a third step in the D-direction.

It will be seen that if a fourth D-pulse comes along at the end of 30 ms., (8) and (9) will remain as they were in the preceding 7 ms., but (10) will become 0. At this time, only gate 14 has 5 on both its inputs. Flip-flop 5 is therefore actuated to make (12) and (13) 0 and 5, respectively, flip-flop 6 keeping 0 and 5 on (14) and (15), respectively. Since (17) continues 5, the inputs of gates 27 and 47 are each 5, whereas each of gates 17 and 37 have one input at 0. Accordingly, Q2 ceases to fire. Q1 begins to fire, Q4 remains unfired, and Q3 continues to fire, windings L1 and L3 are energized and the motor begins a fourth step.

The end of the fourth D-pulse, as before, causes the multivibrator pulse to maintain (17) at 5, and (7) to return to 0, so that flip-flop 3 makes (8) and (9) go to to 0 and 5, respectively. While (11) remains 5, (10) goes to 5, for now each of gates 14, 24, 34 and 44 have at least one 0 input. Flip-flops 5 and 6 therefore stay as they were when the fourth D-pulse ended, and the multivibrator action maintains the energization of windings L1 and L3 for the next 7 ms.

If, at the end of the fortieth millisecond, each of input terminals D, DL, UL and U remains 5, instead of receiving a pulse, (17) will become O. This puts 5 on lines (18) through (21), a condition in which none of windings L1, L2, L3 and L4 are energized, as will be recalled from the description of the beginning of circuit operation, and in general, all the parenthetically-numbered conductive paths will revert to where they were before the first D-pulse. Actually, (17) takes long enough to return to 0 that (23) and (25) may persist some milliseconds long, but this does not change the last energization pattern of the motor, so the motor is merely energized a little longer than usual but remains in the position the last pulse put it.

It is obvious that if the pulses continue, i.e., there is a fifth D-pulse, and so on, the pattern of winding energization will repeat in fixed order sequences or cycles of four. Now, when the pulses do stop, it is not necessarily on the fourth pulse in the cycle. Remembering that the end of a pulse always puts 0 on (7) and, eventually on (17), it is clear that only the states of flip-flops 3, 5 and 6 need to be considered, in view of say, a cycle of D-pulsing being broken off after the second pulse in the cycle, and being followed by a U-pulse, namely, a 0 on the terminal U, with 5's on the other terminals.

In this case, after the second D-pulse and just prior to the U-pulse, (12) and (13) will be 5 and 0, respectively, just opposite to where they were before the first D-pulse of the cycle. Likewise, (14) and (15) will also be 5 and 0, respectively. However, all the other parenthetically numbered paths will be in their pre-cycle states after (17) decays to 0. The first U-pulse affects the states of lines (1) through (7) as does a D-pulse, except to interchange (1), (3) and (5) with (2), (4) and (6), respectively. That is, the former remain 0, 5, and 0, respectively, and the latter turn 5, 0 and 5, respectively. As before (7) goes to 5. When (7) goes to 0 on the trailing edge of the first U-pulse, the flip-flop 3 makes (8) and (9) go to 5 and 0, respectively. Also, the 5 on (9), left there after the second pulse of the D-cycle, and the 5 on (6) due to the first U-pulse, puts 0 on (10) which had reverted to 5 after (17) became 0 before the U-pulse, whereas (11), which was 5 after the first D-pulse, and continued that way through the next D-pulse, after which D-pulsing was broken off, continues 5. Flip-flop 5 therefore is actuated to put 0 and 5 on (12) and (13), respectively, whereas flip-flop 6 remains where the last D-pulse left it, namely, 5 and 0 on (14) and (15), respectively.

It will be noted that the U-pulse came while flip-flops 5 and 6 were in states that were just opposite to those they were in prior to the first D-pulse. In short, flip-flop 5 is driven to where it was before and during the first 10 ms. of D-stepping, whereas flip-flop 6 is allowed to be where it was during that first 10 milliseconds.

Due to the U-pulse, 5 appears on (17) and the multivibrator pulse maintains this 5 for the next 7 ms. Accordingly, the parenthetically numbered paths assume for this 10 ms. of operation a configuration of 0's and 5's like that obtaining during the first 10 ms. of D-pulse operation. In short, the logical state of the system has gone from 2 to 1, and windings 1 and 4 are energized. Now, in the motor employed, if the step corresponding to what has been taken here to have been the last D-pulse (number 2 in the cycle) is followed by energization of windings L1 and L4, then the corresponding step is in the U-direction. Accordingly, after a number of steps in the D-direction, ending with a step due to the second pulse in a D cycle, the first U-pulse has sent the motor one step backwards.

If a second U-pulse now comes along, 0 arises now on (11) whereas (10) remains (5). Consequently, (12) and (13) remain 0 and 5, respectively, whereas (14) and (15) turn 0 and 5, respectively. The corresponding flip-flops are now both in the state they were before the first D-pulse. Obviously, their sequence of states is going reverse to that during D-pulse, and now winding L1 continues to be energized, winding L3 begins to be energized, winding L4 ceases to be energized, and winding L2 remains unenergized. As this is the condition corresponding to the fourth step of the D-cycle, it is clear that D-pattern of winding energization is being repeated in reverse. It can readily be shown that a third U-pulse will repeat the winding condition of D-step three, a fourth U-pulse will produce the condition of D-step two, and so on. It is also easily shown that cessation of U-pulsing, and a continued absence of D-pulses, will cause the circuit to revert to, generally speaking, the state that existed before the first D-pulse, with which the description of the circuit started.

It will be evident that during periods of all 5's on terminals D, DL, UL and U, that flip-flops 3, 5 and 6 remember the last pulse and which one it was in the cycle, and, hence, maintain the circuit in readiness to go either backward or forward from the step corresponding to said last pulse.

It will be evident, further, that the stepper motor is energized only while stepping, so no energy is being dissipated in the windings between steps. Further, by making the multivibrator provide a little more than 7 ms., say up to about 8 ms., too-narrow D and U-pulses can be tolerated usually without causing an additional step to occur by reason of the slight lengthening of the period of winding energization.

From the foregoing, it will be seen that in great part, the circuit inherently assumes, after each pulse, a state suitable for responding to the next pulse, whether D or U type. Thus, the inputs, at terminals D and U, automatically condition properly and with certainty, everything but the flip-flops 3, 5 and 6.

The three flip-flops 3, 5 and 6 can have eight different output configurations, but the circuit normally operates to permit only four of these to occur and define the described sequence of binary representations giving winding energization patterns. The other four flip-flop output configurations are forbidden, so to speak, but can occur under certain circumstances. For example, if the circuit is off, i.e., the B+ is disconnected, then when it is turned on, the flip-flop output configuration may be any of the eight, unless some means is provided to prevent any forbidden configuration to occur. Such occurrence would cause reversal of the stepping motor, i.e., a D-pulse would make the motor step in the U-direction, for example. According to the invention, the nand gate 30 is provided which will respond to but one of the forbidden configurations by resetting the flip-flops to a permitted configuration, that is, to one of those occurring in normal operation. For simplicity, the said one forbidden configuration is chosen to be 5's on lines (12), (14) and (18), that is to say, in the usual parlance the zero and one output terminal of each flip-flop is one and zero, respectively. The output of flip-flop 30 is normally 5 on line (26), but when its inputs are each 5, then its output becomes 0.

Line (26) is connected to the direct clear or reset connection (as it is variously termed in the parlance of the art) of each of flip-flops 3, 5 and 6. As these are "JK" flip-flops, when these connections go from 5 to 0, then their "zero" and "one" outputs go to "zero" and "one," respectively, or in the present terminology, each of lines (8), (12) and (14) go to 0, or remains there, depending on whether they were 5 or 0 when the gate 30 produced its 0 on line (26). Lines (9), (13) and (15) of course, become or remain 5, simultaneously. Essentially, 5 on (8), (12) and (14), simultaneously is a forbidden state, as it does not correspond to a desired winding energization pattern, whereas essentially, 0 on (8), (12) and (14), is a desired winding energization pattern. In addition, in the particular circuit, when one permissible flip-flop configuration is changing to the next permissible flip-flop configuration, there is sometimes an interval when lines (8), (12) and (14) are very briefly 5 simultaneously. For example, a 5 on line (8) always persists for 13 ms. of each step and continues for 3 ms. into the next following step. Now, when going from the very first described step to the next, or vice versa, (12) and (14) are simultaneously 5 also. Hence, to prevent the gate 30 from acting at these times, line (27) is also connected to gate 30 to provide an input. Line (7), of course, is always 5 when line (8) is 5, so line (27) is then 0 because of the inversion due to gate 18. Accordingly, gate 30 can only act between input pulses to terminal D (or U), because only then can line (27) be 5.

A little thought will show that any of the forbidden configurations might have been chosen to actuate nand gate 30. Thus, if a forbidden configuration including a 0 instead of a 5 had been chosen, an inverting gate would be used to convert the corresponding flip-flop to an input of gate 30, for nanding purposes. Moreover, a relatively complex system of gating could be designed so that any forbidden state, by judicious use of inversions, etc., would show up as all 5's on the inputs of gate 30. However, none of this is necessary. The four forbidden states themselves constitute a fixed order sequence, so that once one of them occurs, the next follows, and so on (the direction, of course, is reversible, just as with the permissible sequence). Accordingly, once started on the forbidden sequence, no more than three consecutive input pulses at the same input terminal is required to reach the chosen forbidden configuration of flip-flops 3, 5 and 6. Immediately, this last pulse disappears, all the inputs to gate 30 are 5, and accordingly line (26) goes from 5 to 0 and resets the flip-flops to the chosen permissible state. It can be shown that the stepping motor envisaged here cannot make more than a half revolution, i.e., two steps in the wrong direction under the influence of the forbidden sequence. Further, the stepping motor is here contemplated to be geared down so highly that these two steps introduce an error of, for example, less than two parts in a thousand in the function of the mechanism operated by the motor. It should be remarked that it is conceivable that D-pulses and U-pulses could alternate, two by two, without resetting occurring. This merely means that the steping motor would oscillate with half-revolution amplitude so that the position of the mechanism driven thereby would be correct, on the average.

Terminals DL and UL provide for limiting the total extent of stepping in any direction. Thus, in setting a controller, the range of setting is normally finite, and stepping past the limits of this range is normally useless, and often damaging to the mechanism driven by the stepping motor, since the capacity of the mechanism for adjustment of its parts is normally limited to the range of adjustment desired. In practice, limit switches DS and US are provided to be acutated by some moving part whose position reflects the adjustment. When the part attains a position correspotnding to one end of the range or another, it actuates a corresponding limit switch, thereby shorting the appropriate one of terminals DL and UL to circuit common. For example, say the limit switch DS acts on terminal DL, putting 0 thereon. This locks the output of gate 21 at 5, which is its state during U-pulsing, and during no pulsing at all. Accordingly, D-pulses at terminal D can no longer drive the stepping motor. At the same time, if U-pulses come along, these can obviously drive the stepping motor in the U-direction, in the manner previously described, thus pulling the mechanism being adjusted away from the D-limit, thereby opening switch DS so that terminal DL becomes 5 again. The circuit is now ready for D-stepping after the U-pulses cease.

Exactly the same kind of action occurs should the limit switch US, corresponding to the U-limit, be actuated. That is, terminal UL goes to 0, gate 31 has its output locked at 5, whereas the circuit remains in condition to operate the stepping motor in response to D-pulse, and so on.

FIG. 3 is pretty much self-explanatory. Thus, a controller operates a valve V or other control element to influence a process. A transmitter T measures some condition in the process, such as temperature and applied a corresponding signal to the controller. The controller compares this signal with an equivalent set point signal representing some desired value of said condition, and causes the valve V to control the process in such fashion that the measured value of said condition changes toward a desired relationship to the set point value (the said relation is normally substantially equality). Boxes P, L and M represent the pulse source, the logical circuitry and motor and motor drive of FIG. 2, the motor being shown as connected to the controller by the dashed line G, signifying the mechanical positioning action of the motor's movable part or parts. This mechanical action changes the value of the set point signal. Thus, in Nichols Pat. 3,127,105, Mar. 31, 1964, a controller's set point voltage S is adjusted by changing the position of a tap 10 on a variable resistor 11. In the Nichols patent, analog adjusting motion is implied. The present invention therefore provides a means for converting pulse-type set point change information into such analog adjusting motion.

The elements of the system of FIG. 2 are entirely conventional. Thus, in one example, the transistors Q1 through Q4 were each RCA–40250, the diodes 1N4002. R1 through R4 and R10 were each 180 ohms, R5 through R8 were 470 ohms, and R9 was 2200 ohms. C1 and C2 were 22 microfarads and B+ at all points was 5 volts DC except for diodes D1 through D4, which were connected to a +24 volts DC supply, as were the motor windings. Except for the limit switches, transistors Q5 and Q6 and the motor, the remainder of the circuitry was embodied in printed circuit chips of the Motorola MC830P series of diode-transistor logic. Operation is not dependent on this manufacurer's product or on DTL logic, and equivalents are numerous. For example, Texas Instrument SN15800N Series printed circuitry can be used. In any event, all flip-flops are of the "JK" type, and all the gates are "nand."

The motor was Automation Development Corp. type 2703–002, a 28-volt motor capable of stepping at the rate of 100 steps per second, at 8 steps per revolution. The revolution of the motor was stepped down by gear train by about 41 to 1, so that the ultimate rotation (output of the gear train) was about 1.1° per step. This operated a set point adjustment device designed so that 100% of adjustment range required some 2000 steps. Accordingly, each step represented a set point change of about 0.05% of scale.

Other motors, of course, whose windings suit the logic sequences developed by the circuit of FIG. 2, could be used also.

The circuit cycle or sequence, namely, the cycle 0110, 1010, 1001, 0101, in forward or reverse order from any member of the cycle, is available at rates up to 100 kHz., the limit per second being imposed in the present case by the stepping motor.

The inputs to terminals D and U could be from a manually-operated shorting switch like switches DS and LS, or any source of a train of pulses of the type contemplated. The circuit shown contemplates the use of a two-circuit channel device P such as a computer, wherein only one channel at a time produces pulses. It will be observed that the input circuitry of FIG. 2 is well adapted for sources utilizing transistorized outputs. Thus, resistors R5 and R6, and their B+ voltages can be collector resistors for output transistors Q5 and Q6 which are fired by applying base voltage, thereby connecting R5 and R6, as the case may be, to circuit common through a collector-emitter resistance of 25 ohms or less, which would pull the voltage at the corresponding terminal D or U down far enough for it to be considered 0 by the corresponding gate 11 or 41. Unfired, these output transistors would lock the terminals D and U at 5.

Further, the input circuitry of FIG. 2 provides a superior alternative to limit switching in the connections to terminals D and U. That is, the gating circuitry connected to terminals DL and UL obviate the frequently troublesome problem of limiting by interrupting high potential and/or high current signals sometimes provided as input to terminals D and U.

The foregoing is a detailed description of how to make and use the best form of my invention known to me therefor. However, many modifications of the described invention will be obvious to one skilled in the art, which will come within the scope of the following claims.

I claim:

1. A digital system having a plurality of gates and a pulse counter; said gates each having a pair of inputs and said counter having as many outputs as there are said gates, there being input means for applying a pulse train of one or more pulses to said counter, and said counter being adapted to count said pulses of said train and to present its count as a binary configuration of pulses on its said outputs;

one of said gates having one only of its said inputs connected to one of the said outputs, a second of said gates having one only of its inputs connected to a second of said outputs, and so on, so that each of said gates has one only of its said inputs connected to one of said outputs;

said system also having gating means for applying said pulse train to each said input of said gates not connected to one of said outputs, whereby which of said gates is enabled and which is disabled depends on said binary configuration of pulses;

said counter being of the up-down type, and said input means having two inputs for connecting said pulse train to said counter; said counter being adapted to count up in response to application of such pulse train to one of the last said inputs, and to count down in response to application of such pulse train to the other of the last said inputs;

said input means including two single-input inverting gates, two two-input nand gates, and counter gating means, and said system including output means responsive to said binary representations of pulses to algebraically accumulate the occurrences of said binary representations of pulses;

one of said inverting gates providing a pulse on one input of one of said nand gates, and the other of said inverting gates providing a pulse on one input of the other of said nand gates, and the outputs of said nand gates being applied to said counter gating means;

said output means being responsive to accumulating a predetermined number of said binary representations of pulses occurring on counting-up to apply a pulse on the other input of said one of said nand gates, and being responsive to accumulating a predetermined number of said binary representations of pulses occurring on counting-down to apply a pulse on the other input of said other of said nand gates; said counter gating means being responsive to unlike outputs only of said nand gates to cause said counter to count;

said output means including motor and motor energizing means, said motor energizing means being connected to the outputs of said gates for energizing said motor in response to said binary configuration of pulses, and said motor being responsive to such energization to execute a positioning step in accordance with said binary configuration;

said energizing means being effectively responsive to said binary representations of pulses to cause said motor to step in a given sense for up-counting but to cause said motor to step in a sense opposed to said given sense for down-counting, whereby the net position change of said motor is always either the excess of total up-count over total down-count or excess of total down-count over total up-count; and there being limit means responsive to predetermined value of such excess to apply a pulse on one or the other of the last two inputs of said nand gates, depending on whether the last said excess is of up-count or of down-count.

2. The digital system of claim 1, wherein said plurality of gates is responsive to absence of pulses from said gating means to prevent said energizing means from energizing said motor.

3. A digital system including a stepping motor having a plurality of windings, each of said windings having its own driving means for energizing said winding in response to an energizing signal, said windings otherwise being unenergized; said system also including logic circuitry and as many gates as there are said windings, and each gate having first and second inputs connected to said logic circuitry and also having an output connected to a corresponding one of said driving means; one part of said logic circuitry being means for applying pulses to various of said first inputs in accordance with desired energization of said windings, and another part of said logic circuitry being connected to said second inputs for providing pulses enabling each said gate such as to produce said energizing signal at the output thereof when its said first input has a pulse thereon from said one part of said circuitry; said logic circuitry including input means for applying a train of pulses to both parts thereof for causing same to apply pulses to said inputs of said gates.

4. The digital system of claim 3, wherein said one part of said circuitry includes means for effectively stretching each pulse of said train of said pulses and for applying such stretched pulses to said second inputs, said other part of said circuitry being a counter for counting said train of pulses and producing its counts in the form of binary representations of pulses applied to said first inputs.

5. The digital system of claim 4, wherein the last said means includes a one shot multivibrator and gating means for applying each pulse of said train to said multivibrator and to said second inputs simultaneously, and for gating pulses produced by said multivibrator to said second inputs, said multivibrator being responsive to each pulse of said train to produce a pulse of length substantially equal to the spacing between consecutive pulses of said train.

References Cited

UNITED STATES PATENTS

| | | | |
|---|---|---|---|
| 3,243,677 | 3/1966 | Cannalte et al. | 318—138 |
| 3,328,658 | 6/1967 | Thompson | 318—138 |
| 3,345,547 | 10/1967 | Dunne | 318—138 |
| 3,435,314 | 3/1969 | Bradley et al. | 318—138 |
| 3,443,181 | 5/1969 | Kozol et al. | 318—138 |

G. R. SIMMONS, Primary Examiner

U.S. Cl. X.R.

318—18